April 22, 1924.

R. W. WIESEMAN

DOUBLE SPEED SYNCHRONOUS DYNAMO ELECTRIC MACHINE

Filed Dec. 5, 1921

1,491,451

Inventor:
Robert W. Wieseman,
by Albert G. Davis
His Attorney.

Patented Apr. 22, 1924.

1,491,451

UNITED STATES PATENT OFFICE.

ROBERT W. WIESEMAN, OF SCHENECTADY, NEW YORK, ASSIGNOR TO GENERAL ELECTRIC COMPANY, A CORPORATION OF NEW YORK.

DOUBLE-SPEED SYNCHRONOUS DYNAMO-ELECTRIC MACHINE.

Application filed December 5, 1921. Serial No. 519,925.

*To all whom it may concern:*

Be it known that I, ROBERT W. WIESEMAN, a citizen of the United States, residing at Schenectady, in the county of Schenectady, State of New York, have invented certain new and useful Improvements in Double-Speed Synchronous Dynamo-Electric Machines, of which the following is a specification.

My invention relates to dynamo electric machines and its principal object is to provide a novel arrangement of the pole pieces whereby such a machine may have two efficient operating speeds. A further object of my invention is to provide a simple circuit arrangement for the exciting windings of the magnetic field whereby they may be quickly changed from one pole number to another and whereby the induced potential across these windings may be kept at low values when the machine is started as an alternating current motor.

It is well known that alternating current windings of synchronous dynamo electric machines may be provided with means for changing the number of poles. This feature has been proposed for starting purposes where the machine is used as a motor. However, it has not been practicable to use more than one pole connection for synchronous operation because the usual direct current exciting magnets do not give the proper distribution of flux for more than one pole connection. In a machine built in accordance with my invention the pole pieces are so shaped that they will produce a good flux distribution whether used singly or in pairs as a single pole. Such a machine may therefore have two efficient synchronous operating speeds.

Figure 1:
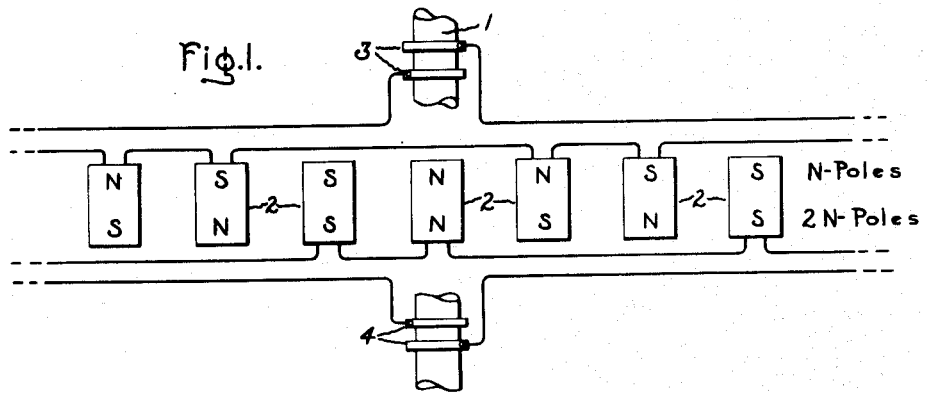
Figure 2:
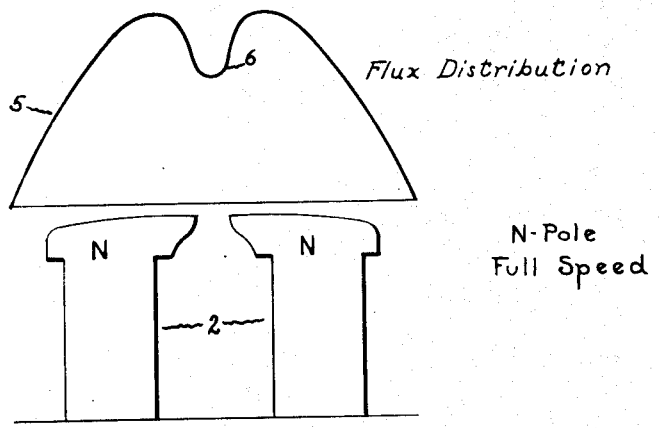
Figure 3:
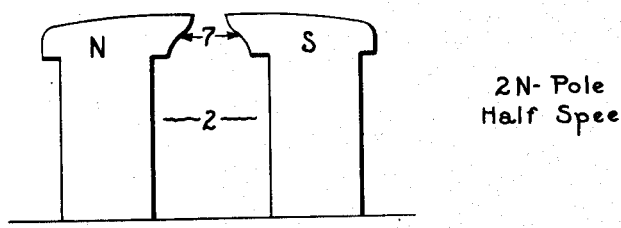

My invention will be better understood from the following description taken in connection with the drawings in which Fig. 1 represents the circuit connections of the multipolar field of a two-speed synchronous machine embodying my invention; Fig. 2 shows the shape of the pole pieces and the flux distribution when two adjacent poles are connected to have the same polarity; Fig. 3 represents the same or similar poles when connected to have opposite polarities.

Referring now to Fig. 1, 1 represents the shaft of a multipolar synchronous dynamo electric machine of the revolving pole type. 2, 2, 2 represents a portion of the salient polar projections of such a machine, a portion of the periphery being represented as laid out flat. The number of polar projections may be 4 or any multiple thereof. Alternate pairs of poles are connected to slip rings 3 and the other alternate pairs are connected to slip rings 4. The two poles which make up each pair are oppositely wound and those connected to one set of slip rings are adapted to have their polarities reversed by reversing the current supplied thereto. The two sets of slip rings may be connected in series so that the current supplied to each set of poles will be the same. This current may be supplied from any suitable direct current source not shown. With this arrangement the field of the machine may be connected for either N poles or 2 N poles where N is any even number by simply reversing the current supplied to one set of slip rings. The lettering on the upper ends of the pole pieces indicate their polarity when the machine is connected for N poles, two adjacent pole pieces being of the same polarity and acting as a single pole while the next two pole pieces act together to form a pole of the opposite polarity. Now, by simply reversing the current supplied to slip rings 3, the polarities of the poles connected thereto are reversed and the field becomes connected for 2 N poles, adjacent poles being now of opposite polarities as indicated by the lettering on the lower ends of the pole pieces. The stator windings of the machine have not been shown but it will be understood that they are wound so as to be connected for either N or 2 N poles. When such a machine is started as a motor, the field circuit will be open or short circuited through a resistance or reactance and the stator windings will be connected for 2 N poles. As soon as the machine comes up to the speed corresponding to this connection the field windings may be energized for 2 N poles if it is desired to operate with this connection. If it is desired to operate with the N pole connection which will give an operating speed equal to twice that of the 2 N pole connection, the field circuit is left connected as before and the stator windings changed over by an appropriate pole changing switch and when the machine comes up to approximately synchronous speed for this connection, the field may be excited for N poles. During the 2 N poles starting period the potential induced across the slip rings will be only half what it would be if the field windings were all connected in series to one set of slip rings as is usual. During the N pole starting period the voltage induced across each pair of slip rings will be approximately zero because then the potential induced in the adjacent field poles which are connected in the same circuit will be in opposite directions and will thus neutralize each other. It is therefore evident that the induced potential across the slip rings for such a machine is kept within reasonable limits when the machine is started as a motor.

In order to produce a good flux distribution of the poles when connected in pairs as a single pole, I make use of the non-symmetrical shape illustrated in Figs. 2 and 3; thus each pole has a non-symmetrical pole periphery formed by stamping the laminations in the shape illustrated in the drawings. The pairs of poles which are to be connected to form a single pole in the N pole connection have the thick long portions of the T shaped poles towards each other, so that while the center line of the pole pieces proper are evenly spaced, or nearly so, the peripheries of each such pair comes rather close together and the peripheries of opposite poles in the N pole connection are further apart. A pair of poles thus connected for the same polarity is illustrated in Fig. 2 and just above the pole pieces at 5 is illustrated the flux distribution curve for the poles when so connected. By making the pole pieces with non-symmetrical pole tips and placing them in pairs with symmetrical tips facing each other it is possible to get approximately a sine wave distribution of the flux over the two pole pieces and therefore very good operating characteristics for the N pole connection. The only place where the flux wave deviates from a sine wave is at 6, Fig. 2, opposite the air gap between the two poles. Furthermore, the machine is made to operate successfully with the 2 N pole connection by making the air gap at 7, Fig. 3, between the two pole projections sufficiently large enough to prevent too much leakage flux between the poles when the 2 N pole connection is used. The form of the flux wave for this connection will be slightly unsymmetrical but will give very good operating characteristics.

While I have described my invention in connection with a machine of the revolving pole type, it is evident that the same is equally applicable to a machine in which the field is stationary whether of the direct current or alternating current type. The exact shape of the pole pieces may be varied somewhat. This will also be true in machines with different numbers of poles and I therefore do not wish to limit my invention to the exact shape shown and described.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A dynamo electric machine of the type having polar projections provided with windings adapted to be connected for either N or 2 N poles, N being any even number, characterized by the fact that the polar projections are shaped and arranged to give approximately a sine wave flux distribution for the N pole connection.

2. A field element for a dynamo electric machine comprising a plurality of substantially equally spaced polar projections, each projection having magnetically non-symmetrical pole tips, said projections being arranged in pairs with magnetically symmetrical pole tips facing each other.

3. A dynamo electric machine comprising a field element having 2 N polar projections, each projection having magnetically non-symmetrical pole tips, said projections being arranged with magnetically symmetrical pole tips facing each other, windings on said projections and means for exciting said windings whereby they may produce 2 N or N poles of alternate polarity where N is any even number.

4. In a dynamo electric machine, a field element comprising 2 N polar projections, N alternate projections having a leading pole tip of greater magnetic reluctance than the trailing pole tip and the remaining projections having a trailing pole tip of greater magnetic reluctance than the leading pole tip, exciting windings on said projections, an electric circuit supplying alternate pairs of projections, said pairs having the pole tips of least magnetic reluctance facing each other, an electric circuit for supplying the remaining pairs of poles, said windings being connected so that a reversal of current in one of said circuits causes said element to be changed from 2 N to N poles of alternate polarity with said pairs acting together as a single pole, N being any even number.

In witness whereof, I have hereunto set my hand this 3rd day of December, 1921.

ROBERT W. WIESEMAN.